US00RE36216E

United States Patent [19]

Telford

[11] E Patent Number: Re. 36,216

[45] Reissued Date of Patent: Jun. 1, 1999

[54] WINCH HAVING AUTOMATIC BRAKE

[75] Inventor: Thomas M. Telford, Gladstone, Oreg.

[73] Assignee: Warn Industries, Inc., Milwaukie, Oreg.

[21] Appl. No.: 08/291,415

[22] Filed: Aug. 16, 1994

Related U.S. Patent Documents

Reissue of:

[64] Patent No.: 5,261,646
Issued: Nov. 16, 1993
Appl. No.: 07/762,433
Filed: Sep. 19, 1991

[51] Int. Cl.[6] ..... B66D 5/02; F16D 51/00

[52] U.S. Cl. ..... 254/375; 188/343; 254/362

[58] Field of Search ..... 254/323, 362, 254/375, 378; 188/70 R, 70.6, 336, 339, 343; 192/7, 8 R, 8 A

[56] References Cited

U.S. PATENT DOCUMENTS

| | | | |
|---|---|---|---|
| 292,828 | 2/1884 | Lawlor | 192/7 |
| 1,911,461 | 5/1933 | Musselman | 101/35 |
| 2,175,383 | 10/1939 | Eason | 192/18 R |
| 2,783,861 | 3/1957 | Jungles | 192/8 R |
| 2,827,136 | 3/1958 | Sorchy | 192/7 |
| 2,834,443 | 5/1958 | Olchawa | 192/8 R |
| 3,536,169 | 10/1970 | Arnold | 192/8 R |
| 3,834,670 | 9/1974 | Pityo | 254/362 X |
| 3,994,376 | 11/1976 | Fulghum | 192/8 R |
| 4,103,872 | 8/1978 | Hirasuka | 254/362 X |
| 4,103,873 | 8/1978 | Sato et al. | 254/362 X |
| 4,461,460 | 7/1984 | Telford | 254/378 X |
| 4,545,567 | 10/1985 | Telford et al. | 254/378 X |
| 4,579,201 | 4/1986 | Tiedeman | 192/8 C |
| 4,601,370 | 7/1986 | Papadopoulos | 254/378 X |

FOREIGN PATENT DOCUMENTS

| | | |
|---|---|---|
| 2270193 | 12/1975 | France . |
| 1216625 | 11/1958 | Germany . |
| 2191744 | 12/1987 | United Kingdom . |

*Primary Examiner*—Michael Mansen
*Attorney, Agent, or Firm*—Robert L. Harrington

[57] ABSTRACT

An automatic brake for vehicle winch that is automatically applied when the applied torque of the drive motor ceases and automatically released upon application of motor torque. The brake features brake pad segments that move radially outward against the interior of the drum to affect braking and retract radially inward to affect releasing of the brake. The pads have tapered ends that mate with opposed frusto-conical shoes. The brake utilizes rotation of a cam rotatable with respect to a cam follower in one direction to force one shoe toward the other to force the pads radially outward to engage the interior surface of the drum. Rotation of the cam with respect to the cam follower in the opposite direction releases the braking action. A wave spring is incorporated to eliminate chatter as the brake is applied and released. The configuration of the brake components provides a conductive path for the dissipation of heat generated by the braking action.

10 Claims, 3 Drawing Sheets

WINCH HAVING AUTOMATIC BRAKE

Matter enclosed in heavy brackets [ ] appears in the original patent but forms no part of this reissue specification; matter printed in italics indicates the additions made by reissue.

BACKGROUND INFORMATION

1. Field of the Invention

This invention relates to a brake mechanism for a winch having particular application to a winch for controlling the unwinding play out of the winch cable with the cable under unwinding induced load tension.

2. Background of the Invention

The type of winch as particularly contemplated herein is a winch mounted to the front bumper of a vehicle, specifically, a vehicle that has four-wheel drive and is driven on off road terrain. The winch includes a rotatable drum, a cable wound onto and off of the drum, and a motor and brake mechanism that controls the drum rotation.

Such a winch will be used to pull the vehicle up steep hills through mud and snow and for lowering the vehicle down steep slopes. Lowering a vehicle down a steep slope, in particular, creates a braking problem for the winch to which the present invention is directed.

A heavy weight or force pulls against the cable and urges unwinding of the cable from the drum. The drum can be locked against rotation to prevent unwinding quite satisfactorily with a number of brake designs. However, if the cable is to be controllably played off the winch, e.g., when lowering a vehicle down a slope, the braking action is that of controllably resisting or slowing the drum rotation in order to maintain control over the play out. In brake systems that are known, the application of such controlled resistive (as differentiated from preventive) braking action generates excessive heat, creates rapid wear, and results in early brake failure.

BRIEF SUMMARY OF THE INVENTION

In the preferred embodiment, the brake mechanism is contained within the hollow cable drum with brake pads that radially expand against the inner wall of the drum. The drum itself absorbs the heat generated by the braking action which is conducted to the outer side of the drum and thus to the atmosphere. The prior problem of excessive heat is thereby alleviated.

The brake pads are part-round segments that cooperatively form an open ended cylinder that is circumferentially expandable. The open ends form frusto-conical end surfaces. Frusto-conical shaped shoes are axially positioned at the open ends of the brake pad segments, one being axially stationary and the other axially movable. For brake engagement, an axially directed force is applied to the movable shoe to force the conical surfaces of the shoes against the conical surfaces of the open ends of the cylindrically arranged brake pads. The conical shape of the two shoes in concert acting against the conical surfaces of the brake pads forces radial expansion of the segments against the drum wall. For brake disengagement, the axial force on the movable shoe is removed to allow the brake pad segments to collapse inwardly away from the drum wall.

The axial force applied to the movable shoe is cam actuated, i.e., a cam is biased by a torsion spring to rotate against a cam follower with the cam surfaces thereby urging axial movement of the shoe toward brake engagement. The biasing of the torsion spring is to supply the initial but low brake drag resistance. It is the load on the wire rope that causes the cam follower to ride up further on the cam, thus increasing brake resistance substantially and proportional to the load on the wire rope.

The winch motor is driven in both directions, one to wind and the other to permit unwinding of the cable onto and off of the drum. In the wind up direction, the cam follower is engaged by a motor shaft coupling to urge rotation counter to the spring biased rotation, thereby relaxing the brake and allowing the motor to drive the drum in the wind up direction. In the unwind direction, the cam (rather than the cam follower) is engaged which also is counter to the spring biased rotation, thereby relaxing the brake and allowing the load tension to controllably unwind the cable. The rotatable drum is directly coupled to the cam follower and rotation of the drum and cam follower as induced by the load pulling the cable and which becomes faster than the rotation of the motor driven cam allows re-engagement of the brake. This unwinding action results in a brake release/brake engagement repetition that is largely alleviated by a wave spring that permits restricted axial movement of the cam follower and avoids chatter. The above will be more clearly understood with reference to the following detailed description and drawings.

DESCRIPTION OF THE PREFERRED EMBODIMENT

Figure 1:
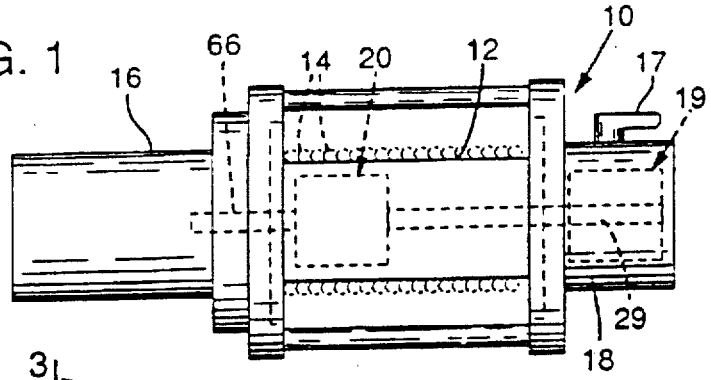
FIG. 1 is a view of a motorized winch having a drum for winding and unwinding a length of cable and having a brake mechanism in accordance with the present invention.

Refer now to FIG. 1 of the drawings which illustrates a winch 10 that is suited for mounting to a vehicle (not shown) such as a four-wheel drive pickup or the like. The winch 10 has a rotatable hollow cylindrical drum 12 for winding and unwinding a length of wire rope or cable 14 on its periphery. The drum 12 may be positively driven in either direction by a reversing motor 16. The motor is generally electric, receiving its power input from the vehicle battery, but other types of motors, such as hydraulic, may be utilized to provide the motive power to drive the winch 10. The motor 16 is coupled to the drum 12 by a speed reducing gear train contained in the end housing 18. The gear train reduces the rotational speed of the drum with respect to the motor rpm (and thus provides torque amplification) in a manner such as disclosed in the commonly assigned U.S. Pat. No. 4,545,567. A shift lever 17 is provided to disengage the gear train so the drum may be rotated free of the gear train so that cable 14 may be played out off the drum manually for example. A brake 20 is provided in the interior cavity of the drum 12 between the drive motor 16 and the gear train in the end housing 18.

Figure 2:
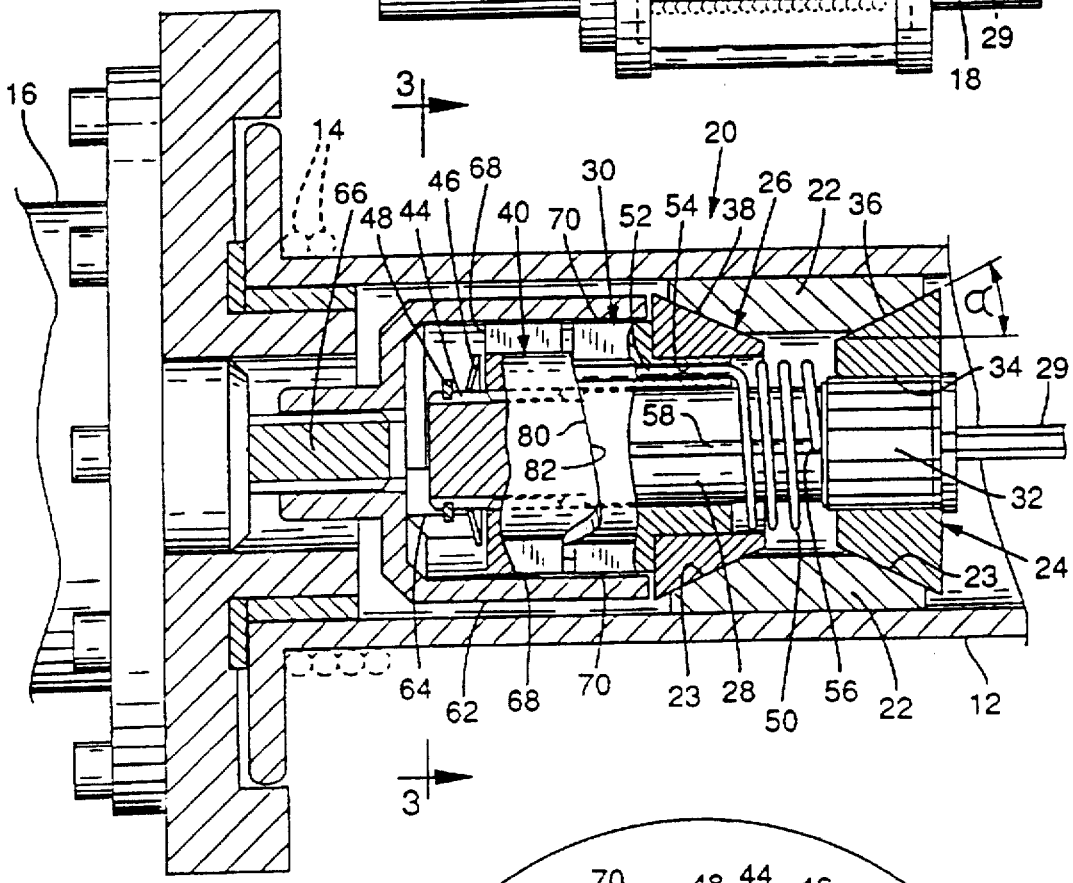
FIG. 2 is a cut away view of the drum of FIG. 1 showing the brake mechanism of the present invention.
Figure 3:
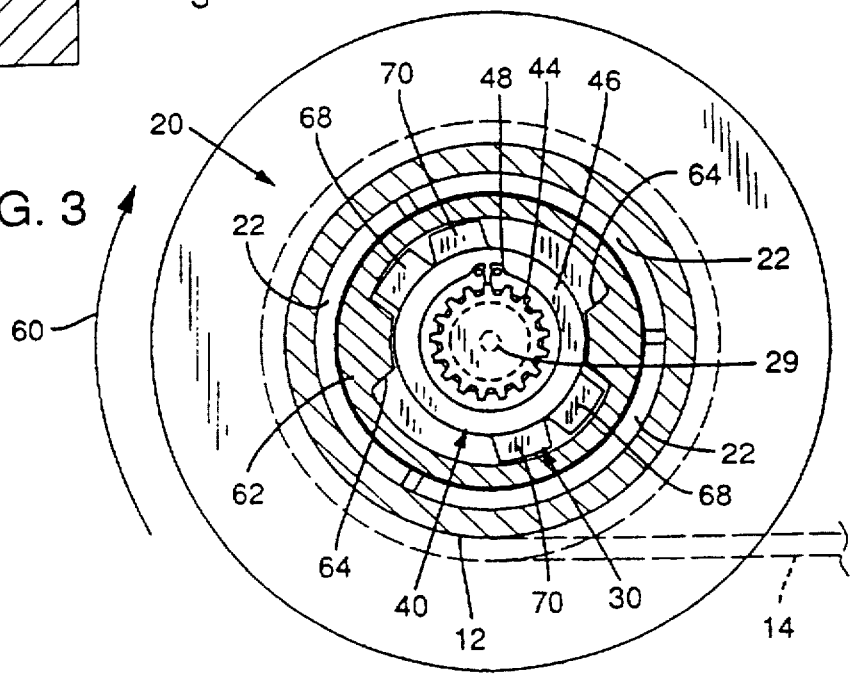
FIG. 3 is a view on view lines 3—3 of FIG. 2.
Figure 4:
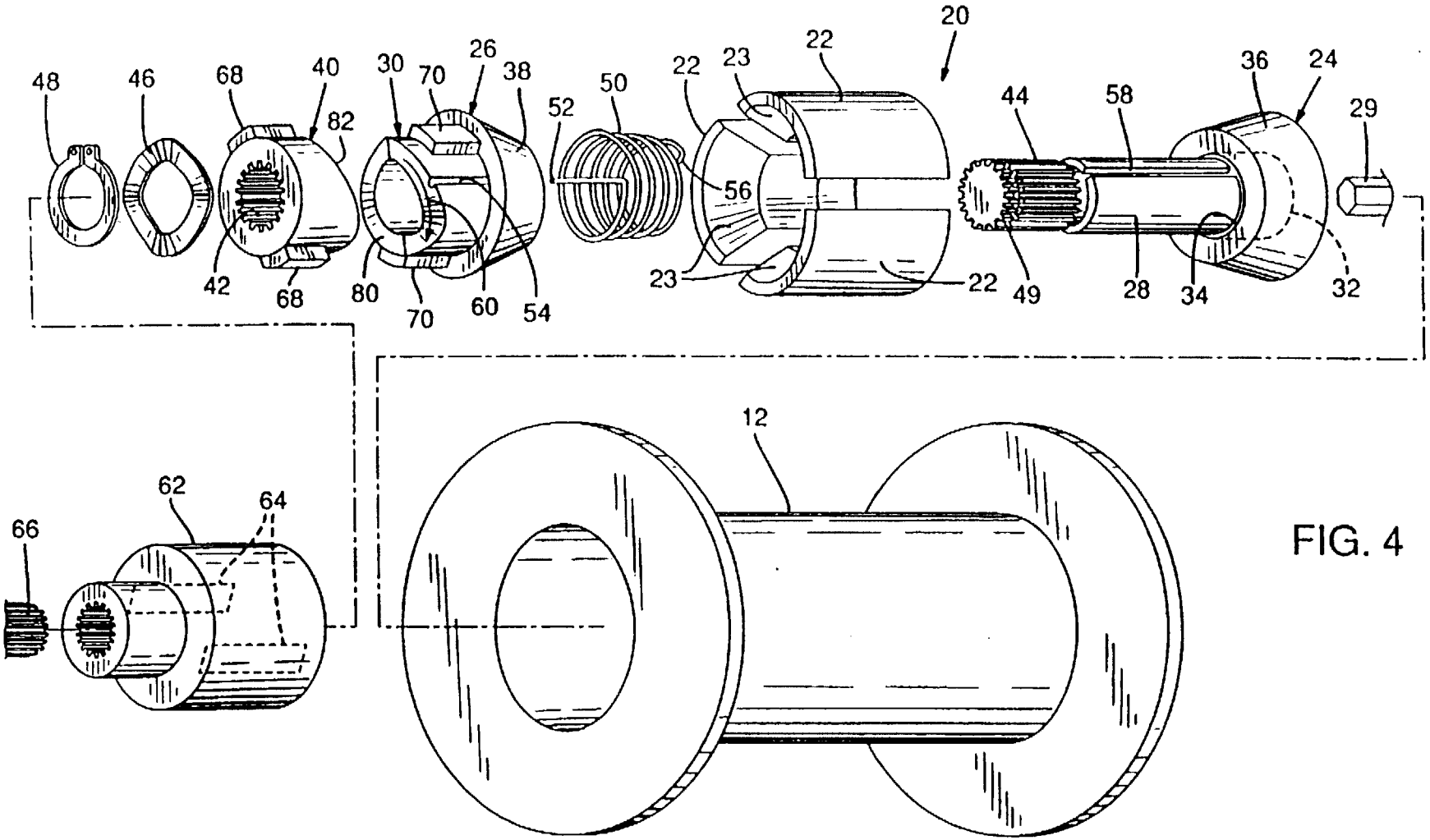
FIG. 4 is an exploded view of the brake of FIG. 2.

The brake 20 is shown in detail in FIGS. 2–4 and as shown, utilizes brake pads 22 that are segments of a cylinder having an outside dimension that closely approximates the interior dimension of the cylindrical drum 12. The pads 22 have internal tapers 23 at each of their ends and cooperatively form frusto conical surfaces that mate with frusto conical shoes 24, 26. Axial movement of the shoes 24, 26 inwardly against the internal tapers 23 of the pads 22 forces the pads (i.e., a form of camming action) to move radially outward to frictionally engage the interior surface of the drum to thus cause a braking or locking of the drum relative to the pads 22 and shoes 24, 26. Shoe 24 is fixedly coupled to shaft 29 which couples the rotation of shaft 28 to the gear train in end housing 18. An end portion 32 of shaft 28 is serrated and the shoe 24, having a serrated bore 34, is pressed on the end 32 to fixedly secure the shoe 24 to the shaft 28. The shoe 24, as previously mentioned, is frusto conical and has a tapered surface 36. The shaft 29 is coupled to the shaft 28 (hexagonally-shaped shaft 29 is received in a hexagonal bore in the end of the shaft 28). Shaft 29 is coupled to the gear train in the end housing 18 (see FIG. 5) to thereby rotatively couple the brake shaft 28 to the gear train 19. The gear train is designed to substantially reduce the rate of rotation as between the shaft 28 and the drum. By locking the shoe 24 to the drum through pads 22, the gear train 19 cannot generate the relative rotation as between the drum and shaft 29 and is thereby locked and the drum is prevented from rotating. Axial movement of the shoes 24, 26 away from each other and thus away from internal tapers 23 of the pads, permits the pads to move radially inward to thus relieve the braking action and allow the drum to rotate.

Axial movement of the shoes is effected by cooperative action of a cam and cam follower which will now be explained with reference to FIGS. 2–4. A cam 30 is mounted on the shaft 28 but is free to move rotatably and axially relative to shaft 28. Shoe 26 is fixedly attached to the cam 30 (and not to shaft 28) and thus will have the same rotative and axial movement as the cam 30. The shoe 26 is frusto-conical and has a tapered surface 38. A cam follower 40 having a splined bore 42 is fitted to a splined end portion 44 of the shaft 28 adjacent to the cam 30. The cam follower 40 is non-rotative with respect to the shaft 28, but can move axially along the splines on the splined end 44 of the shaft 28.

As best seen in FIG. 4, the cam follower 40 has two radially extending ears 68 positioned at 180 degrees from each other. The cam 30 also has two radially extending ears 70 positioned at 180 degree from each other. A wave spring 46 is mounted adjacent the cam follower 40 as shown in FIG. 2. A clip 48 is fitted in a groove 49 on the end of the shaft 28 adjacent the wave spring 46 to secure the assembly of the components on the shaft 28. Accordingly, the cam follower 40 can move axially away from cam 30 through compression of the wave spring 46 but such movement is resisted.

The cam 30 is biased to rotate on the shaft 28 by a torque spring 50. One end 52 of the torque spring 50 is fitted in a bore 54 in the cam 30 and the opposite end 56 engages a groove 58 in the shaft 28. With reference to FIGS. 3 and 4, the cam 30 is biased by the spring 50 to rotate clockwise with respect to the shaft 28 and thus cam follower 40 (spline fit thereto) as indicated by the directional arrow 60.

From FIGS. 1–3, the motor 16 is coupled to the cam 30 and follower 40 by a coupling 62 fitted to the shaft 66 of the motor 16. The coupling 62 is cup shaped and has two drive dogs 64 extending radially inward within the cup portion of the coupling 62. The cup portion of the coupling 62 fits over the radially extending ears 68, 70 of the cam follower 40 and the cam 30 in a manner that positions the drive dogs 64 of the coupling for rotative engagement with ears 68, 70 of the cam follower and cam.

The cam action is provided by two sloping cam surfaces 80 provided on the end of cam 30 (forming wave-like peaks and valleys) which slidingly engage two similar sloping cam surfaces 82 on the cam follower 40. When the peaks of cam surfaces 80 are nested in the valleys of cam surfaces 82, the shoe 26 is withdrawn axially, the pads 20 are withdrawn radially and the drum is free to rotate. Upon relative rotation of the cam 30 to cam follower 40, the cam surfaces 80, 82 are ramped apart which forces axial movement of shoes 26 toward the pads 22 to lock the drum.

The action of the spring 50 is to induce rotation of cam 30 in direction 60 relative to follower 40 and thus urges separation of . the cam and cam follower. The action of rotation in direction 60 of coupling 62 is to engage ears 68 of follower 40 which opposes the spring 50 action thereby producing the nested position of the cam and follower to relax the brake. Rotation of coupling 62 in the opposite direction engages ear 70 of cam 30 which also opposes the spring 50 action to again relax the brake. Thus, in either direction of rotation of motor drive shaft 66, the braking action is relaxed whereas non-rotation of the motor drive shaft 66, through rotation of the cam and follower initiated by spring 50, results in brake engagement (the load effecting the full braking action). The effect of these relative braking actions is explained in the following "Operation" section.

OPERATION

The brake 20 is normally applied or engaged whenever rotative torque from the motor is absent, i.e., by the cam action urged by spring 50. An applied torque from the motor 16 in either direction is required to release the brake 20 to permit rotation of the drum 12. Consider first the condition where it is desired to reel in cable onto the drum 12 to pull a load. The load may be an object at a distance from the vehicle to which the cable is attached or it may be a condition where the end of the cable is anchored and it is desired to pull or assist in moving the vehicle by utilization of the winch. As previously stated, the brake 20 is normally applied to stop rotation of the drum and will remain applied until the drive motor 16 applies rotative torque to the brake 20. Referring to FIG. 3, the motor 16 is driven in a clockwise direction 60 to reel in cable 14 on the drum 12. The drive dogs 64 of the coupling 62 will engage the ears 68 of the cam follower 40 to rotate the cam follower 40. Cam 30 and shoe 26 are in frictional engagement with pad 22 and thus drum 12, and this rotation, as applied between the cam and cam follower, is opposite the urged rotation of spring 50. The effect of such motor driven rotation of cam follower 40 results in release of the braking action and because the cam follower 40 is splined to the shaft 28, through the gear train in housing 18 to the drum, the drum is rotated to reel in the cable.

In the alternate condition when a load is applied to the cable 14 and it is desired to play out cable 14 from the drum 12 under power, the motor 16 is driven counterclockwise or opposite the direction of arrow 60. The drive dogs 64 of the coupling 62 will engage the ears 70 on the cam 30 to urge rotation of the cam 30 in the counterclockwise direction. Recall that the cam 30 is free to rotate on shaft 28 independent of the cam follower 40. As the cam 30 is rotated by the motor 16, the cam 30 (and shoe 26) will move rotatably relative to follower 40, thus moving the cam surfaces 80, 82 toward the nesting condition, resulting in movement of shoe 26 away from pads 22. The brake 20 is thereby relaxed just enough to permit the load on the cable 14 to force rotation of the drum 12 and play out of the cable. The motor torque in effect shifts the balance of forces from an overpowering brake force to an overpowering drum unwind force, i.e., the motor produces just enough torque to permit the force of the load to overcome the static braking action (converting it to a frictional steady braking action) and thereby controlled unwinding of the cable.

The description of the braking action described to this point under the different operating conditions have dealt with the movement of the movable shoe toward and away from the fixed shoe to radially expand and retract the pads to affect the application and the release of the brake. The principals described are sound. The rotative action of motor 16 regardless of its direction of rotation always urge brake release and the rotative action of spring 50 and the load on the cable always urge brake engagement. In the wind up rotative direction of motor 16, (direction 60) the load force (on cable 14) is directly controlled by the motor acting on follower 40 (splined to shaft 28). Such rotation counters the rotation of spring 50 but spring 50 continuously urges rotation of cam 30 away from cam follower 40. However, the slight frictional engagement as between shoe 26 and pads 22 (possibly enhanced by friction between pads 22 and the drum interior) will insure torsional compression of spring 50 and maintain shoe 26 in the retracted or released condition. In the opposite direction of motor drive, the rotative urging toward the engaged condition as induced by the load on cable 14 can far exceed that of spring 50. The countering forces applied to the cam and follower are one of; first motor rotation of cam 30 relative to follower 40 to release the brakes, then a load induced counter rotation of follower 40 relative to cam 30 to overtake the rotation of cam 30 thus engaging the brakes and stopping cable play out until the motor rotation again releases the brake, ad infinitum. This repetitive cycling of brake engagement and release can set up a chatter that is undesirable. The function of the wave spring 46 serves to alleviate this chatter condition.

Tests have shown that without the wave spring 46, the brake assembly is subject to abrupt impacts as the brake is applied and released resulting in severe vibrations or chattering which may rapidly destroy or deteriorate the components of the brake 20. It is believed that the wave spring 46 provides a yieldable biasing force allowing the cam follower 40 to have a slightly rearward flexing action as the cam surfaces 80, 82 are urged back and forth due to the rapid relative rotative changes of the cam 30 and the cam follower 40. The brake 20 is thus not abruptly applied to stop the drum 12, but is applied gradually (in relative terms) to thus decelerate the brake 20 and the drum 12 from a rotating condition to a stopped condition. This same flexing action is believed to provide for the gradual release of the brake. The brake 20 is of course driven by the motor at a much higher rate than the drum 12, the ratio being on the order of 200 to 1, therefore the deceleration of the drum is not visually discernable.

In a situation where the load on cable 14 is not sufficient to generate play out rotation of the drum, the coupling 62 driven by the motor will initially contact the ears 70 of the cam 30 and as rotation continues, the brake will be released as previously described. Since the load is not adequate to cause rotation of the drum, the cam 30 rotates relative to the cam follower 40 until the ears 68, 70 are in alignment and the drive dogs 64 of the coupling 62 engage both sets of ears 68, 70. The drive dogs 64 of the rotating coupling 62 engaging the ears 68 of the cam follower 40, which is fixedly coupled to the drum 12, will rotate the drum. Alternatively, the operator can manually play out the cable without the use of the motor by disengaging the gear train, i.e., disengaging the shaft 28 from the drum 12 with the lever 17.

Additional observations are believed of some importance for optimum operation of the preferred embodiment as described. First, the angle of the frusto conical surfaces 23 and mated surfaces 36 and 38 are provided on the pads and shoes 24, 26, are angled to force unassisted axial movement of movable pad 26 when the cam 30 and follower 40 are in the nested position. Using typical friction brake lining braking materials for the frusto conical faces, e.g., FMC NA104, manufactured by Friction Material Corp., South Bend, Ind., the angle alpha (FIG. 2) is preferably about 25 degrees, with an acceptable range of about 15 degrees to 35 degrees.

Whereas the pads 22 are designed to slide rotatably relative to the cable drum 12 during cable wind up and unwinding, the initial release of the brake requires a rotative sliding of one of the shoes 24, 26 relative to the pads 22. Shoe 26, of course, has to rotate relative to shoe 24 (which is locked to shaft 28) in order to collapse the spring 50 and release the brake.

Figure 5:
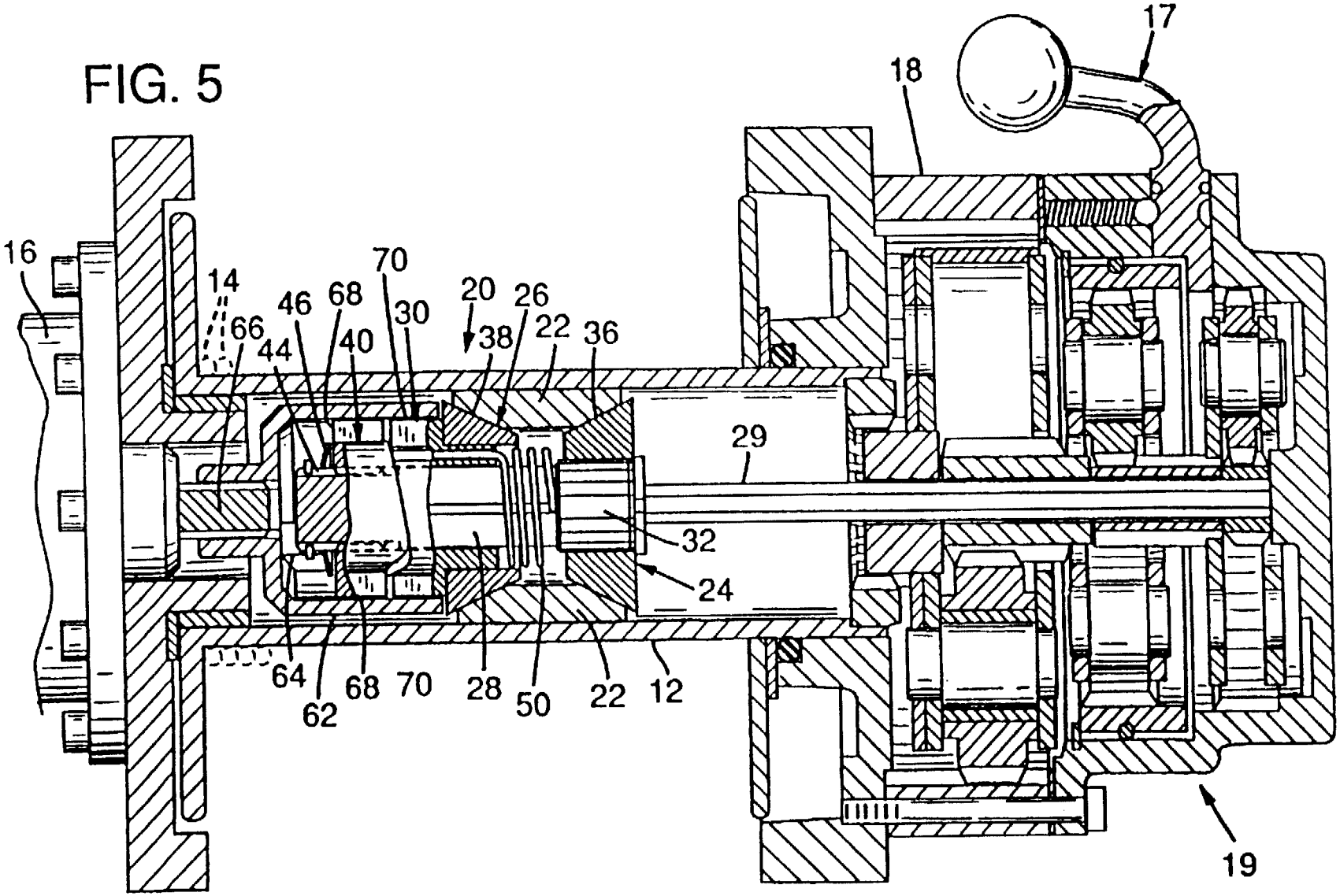
FIG. 5 illustrates a gear train coupling such as incorporated in the winch of FIG. 1.

Whereas a drive train that includes gear reduction is common for winches of the type herein contemplated, such gear reduction is important to achieve braking of the drum rotation. That is, locking the drum to the drive shaft 28 would not prevent rotation if the shaft and drum were coupled for rotation at the same rate of rotation. Whereas the gear reduction requires different rotative speeds, the gears provide an important element in the lock up by locking the rotation of the drum to the drive shaft. Such a gear arrangement contained within housing 18 and indicated generally by reference 19 is illustrated in FIG. 5. It is the same gear mechanism illustrated in the above-referenced patent and is not herein disclosed in detail.

Those skilled in the art will recognize that modifications and variations may be made without departing from the true spirit and scope of the invention. The invention is therefore not limited to the illustrations and description set forth but is to be determined by the appended claims.

What is claimed is:

1. In a winch having a rotatable drum rotatable in both rotative directions, a cable wound onto the drum in one rotative direction and off the drum in a second rotative direction, a drive motor having a drive shaft selectively rotated by the motor in either direction of rotation, and interconnecting mechanism interconnecting the drive shaft and the drum for rotatably driving the drum, said interconnecting mechanism including a gear train that reduces the rotative speed of the drum relative to the motor shaft, and brake mechanism for controlling rotation of the drum comprising:

said drum having a cylindrical inner surface defining an axis, a plurality of brake pads cooperatively arranged to provide a cylindrical outer braking surface and arranged adjacent the inner surface of the drum, said brake pads having radial movement toward and away from the inner surface of the drum, a brake shoe cooperatively arranged relative to the pads and axially movable into and away from the pads to induce radial expansion and permit radial retraction of the pads, a cam and cam follower having cooperative cam surfaces that urge axial separation thereof upon relative rotation of the cam and cam follower in a first rotative direction, and permit axial nesting thereof upon relative rotation of the cam and cam follower in a second rotative direction, a coupling that independently couples the motor shaft to the cam and cam follower, said coupling initially engaging the cam with the motor shaft driven in one rotative direction and initially engaging the cam follower with the motor shaft driven in the other rotative direction to initiate relative rotation of the cam and cam follower in said second relative rotative direction with the motor shaft driven in either rotative direction.

a first biasing member urging rotation of the cam and cam follower in the first rotative direction, and said brake shoe arranged relative to said cam and cam follower for axial urging of the brake shoe toward the brake pads upon axial separation of the cam and a cam follower.

2. A brake mechanism as defined in claim 1 wherein one of said cam and cam follower is coupled to said brake shoe for axial movement therewith, and a second biasing member permitting restrictive axial movement of the other of said cam and cam follower in the opposite direction to cushion the effect of repetitive braking in the drum during cable unwinding.

3. A brake mechanism as defined in claim 2 wherein the arranged brake pads form frusto conical end surfaces, a brake shoe fixed adjacent one end and having a frusto conical surface mated to the corresponding brake pad end, and said movable brake shoe adjacent the other end of the pads and having a frusto conical surface mated to the pads and having a frusto conical surface mated to that brake pad end, said separating movement of the cam and cam follower forcing said movable shoe against the frusto conical end of the brake pads, the opposite end thereof being forced against the frusto conical surface of the fixed shoe to force radial movement of the brake pads.

4. A brake mechanism as defined in claim 3 wherein said interconnecting mechanism includes a shaft that extends from one of said cam and cam follower to said gear train, said one of said cam and cam follower spline fit to said shaft whereby rotation of said one of said cam and cam follower forces rotation of the gear train and thereby rotation of the drum, and said coupling including a drive dog and said cam and cam follower including ears rotatively engageable by said drive dog, said rotative positions of the drive dog and ears arranged whereby in one rotative direction of the motor shaft the ear of said one of the cam and cam follower is engaged by the drive dog and urged counter to the urging of the first biasing member, and in the other rotative direction of the motor shaft the ear of the other of the cam and cam follower is engaged by the drive dog and urged counter to the urging of the first biasing member.

5. A brake mechanism as defined in claim 4 wherein engagement by the drive dog with the ear of said one of said cam and cam follower urges cable wind-up rotation of the drum.

6. A brake mechanism as defined in claim 5 wherein the first biasing member is a torsional spring having one end anchored to the shaft and thereby is rotatively fixed to said one of the cam and cam follower, and the other end fixed under tension to the other of said cam and cam follower to urge relative rotation therebetween.

7. A brake mechanism as defined in claim 6 wherein said one of said cam and cam follower is engaged by the resistive second biasing member and said other of said cam and cam follower urges the movable shoe toward the brake pads.

8. A brake mechanism as defined in claim 7 whereby the second biasing member is a wave spring interposed between the shaft end and the said one of said cam and cam follower.

9. In a winch having a drum rotatable in both rotative directions, a cable wound onto the drum in one rotative direction and off the drum in a second rotative direction, a drive motor having a drive shaft, and interconnecting mechanism interconnecting the drive shaft and the drum for rotatably driving the drum, said interconnecting mechanism including interconnected gears reducing the rotative speed of the drum relative to the motor shaft, and brake mechanism comprising:

said drum having a cylindrical inner surface, a plurality of brake pad segments arranged to form a cylinder located inside the drum, said brake pads having radial movement toward and away from the inner surface of the drum, shoes having tapers mounted on said interconnecting mechanism, said shoes engaging opposite ends of said pads, one of said shoes moveable axially toward and away from the other shoe, a cam affixed to the moveable shoe, said cam rotatable on said mechanism and moveable axially with said moveable shoe, a cam surface formed on said cam, a cam follower mounted to said mechanism, a cam surface formed on said cam follower and in abutment with the cam surface of said cam, a spring connected to said cam, said spring biasing said cam to rotate in a first direction relative to said cam follower whereby said cam surface of said cam acting on said cam surface of said cam follower forces said moveable shoe to move axially toward the other shoe to thereby force said pads to move radially outward to engage the inner surface of the drum.

*10. A winch comprising:*

*a housing;*

*a cable drum assembly having opposed ends and a cylindrical exterior surface, said drum assembly rotatably mounted to the housing and a cable mounted to the exterior surface of the drum to be wound onto and off of the drum upon alternate rotation of the drum;*

*a motor having a drive shaft mounted to the housing at one end of the drum, a shaft extension coupled to the motor drive shaft and extended through the center of the drum to the opposite end of the drum, a gear reducer mechanism at said opposite end engaged with the shaft extension, said gear reducer engaged with the drum and configured to reduce the rotational effect of the drive shaft as applied to the drum;*

*a brake surface on said cable drum assembly, a brake pad, a movable braking member provided on said shaft extension and rotatable therewith and movable between engaged and disengaged positions to frictionally press said pad into braking engagement with said brake surface of the drum assembly whereby, when engaged, the relative rotative movement between the shaft extension and the drum is resisted; and*

*a cam mechanism actuating said braking member including a cam actuator and a cam follower having mated cam surfaces whereby alternate relative rotation allows axial nesting in one direction and forces axial separation of the cam actuator and cam follower in the other direction, said braking member carried by one of said cam actuator and cam follower whereby axial separation thereof moves the braking member and brake pad into braking engagement with the brake surface of the drum assembly, and a biasing member rotatively biasing the actuator and follower to the axial separation condition, and a driver coupling the motor's drive shaft to the cam actuator and cam follower whereby rotation of the driver in either rotative direction counters the biasing action member to permit axial nesting and disengagement of the braking member.*

* * * * *